April 30, 1957  C. A. CRAWFORD  2,790,669
HANDLE ASSEMBLIES
Filed Jan. 5, 1953

INVENTOR.
CLARK A. CRAWFORD
BY
ATTORNEY.

2,790,669

HANDLE ASSEMBLIES

Clark A. Crawford, Painted Post, N. Y., assignor to Corning Glass Works, Corning, N. Y., a corporation of New York Application January 5, 1953, Serial No. 329,655

6 Claims. (Cl. 294—31.2)

The present invention relates to utensil assemblies most commonly employed for culinary purposes and to handle assemblies particularly adapted for use with utensils or vessels made of vitreous material such as glass and the like, although equally applicable to vessels made of other materials.

The prime object of the invention is the provision of band and handle assemblies of simple forms embodying a wedging action that permits their satisfactory assembly to utensils having areas to be encircled by the band whose daimeter may vary considerably because of the manufacturing processes employed.

In the accompanying drawing Fig. 1 is a side elevational view of a vessel assembly embodying one form of the invention.

Figure 1:
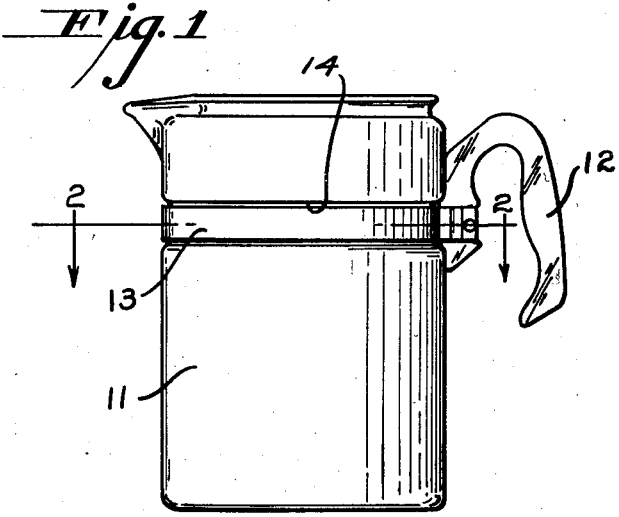

The utensil assembly as illustrated in Fig. 1 consists primarily of a vessel 11, a handle 12 and a band 13. The vessel 11 has a surrounding groove 14 in its side wall adapted for occupation by band 13. The ends of band 13 have opposing portions such as 15 that extend outward and in generally parallel spaced relation from the vessel for a short distance adjoining portions such as 24 that extend at angles toward one another for a short distance, and followed by portions such as 17 in substantial parallel relationship. The band at the extreme ends has tips 18 bent at right angles in such directions as to face one another. The band portions such as 17 are provided with aligned apertures occupied by a clamping bolt 20.

The handle 12 has a wedge portion 22 having a base 23 for abutment against the vessel wall and recessed side walls such as 25 whose recessed surfaces are generally parallel to band portions such as 15 and 17, joined by tapered recessed surfaces such as 16 parallel with the adjoining band portions such as 24, so that as the band end portions, such as 17, are drawn toward one another by bolt 20 the band portions such as 24 exert a wedging action on handle wedge portions such as 16 forcing the handle surface portion 23 into tight engagement with the vessel wall. Added rigidity of the handle 22 and band 13 with respect to the vessel 11 also results from the fact that all portions such as 15, 17, 18 and 24 of the band occupy recesses in walls, such as 25, of the handle.

Figure 3:
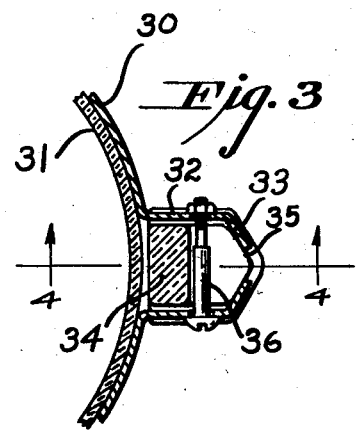
Fig. 3 is a fragmentary view familiar to Fig. 2 of an alternative form of the invention applied to a differently shaped piece of ware.
Figure 2:
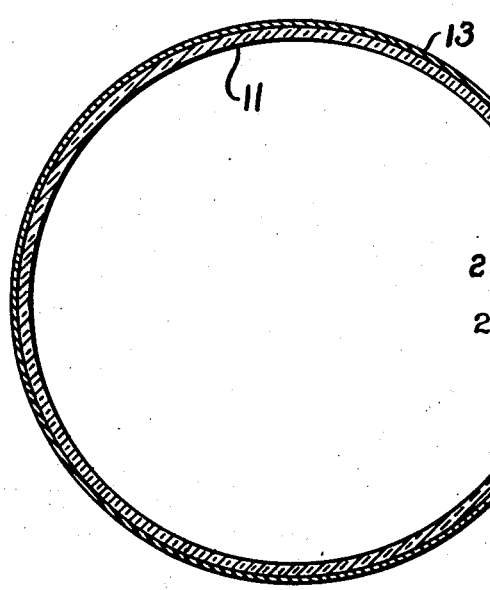
Fig. 2 is an enlarged sectional view taken on line 2—2 of Fig. 1.
Figure 4:
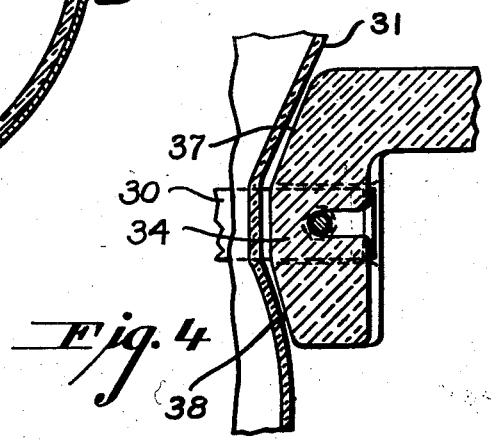
Fig. 4 is a sectional view taken on line 4—4 of Fig. 3.

In the modified form of the invention illustrated in Figs. 3 and 4 the shapes of the handle and band ends are considerably simplified while the wedging action of the structure of Figs. 1 and 2 is retained. The band 30 encircles the vessel 31 and has generally parallel spaced end portions such as 32 and wedge surface engaging end portions such as 33 occupying recesses in handle 34 which has wedge surfaces such as 35 over which the band end portions such as 33 ride as the bolt 36 draws the band end portions toward one another, thus forcing the handle surfaces 37 and 38 into tight engagement with the wall of vessel 31 as tension is applied to band 30.

What is claimed is:

1. In a handle and band assembly for attachment to a utensil, a handle having a wedge portion whose base is arranged for abutment against the utensil, a band for encircling the utensil having extensions parallel to and in slidable engagement with the tapered surfaces of such wedge portion of the handle, end portions of said band extending generally parallel to one another beyond said tapered surfaces, and means cooperative with the band end portions for clamping said band tightly about the utensil and against the tapered surfaces of said wedge portion and for forcing the utensil and handle into tight engagement with one another.

2. A utensil band and handle assembly which includes, a band that encircles a portion of the outer circumference of a utensil and is provided with spaced portions extending outwardly from the utensil along planes which intersect one another at a point remote from the utensil and provided with end portions occupying substantially parallel planes having aligned apertures therethrough, a handle having recesses for the receipt of said band portions and said band end portions, said recesses having wedge surface bottoms of the general configuration of the space between such first referred to spaced band portions and of said band end portions respectively, and means occupying said apertures operative to clamp said band end portions closer to one another whereby the first referred-to spaced band portions slidably engage said wedge surface bottoms to force the handle to slide toward the utensil.

3. In a handle and band assembly for attachment to a utensil, a handle having a generally wedge-shaped portion whose base surface is adapted for abutment against the utensil and whose wedge surfaces are in planes approximately 45° from the plane of such base surface, a band for encircling such utensil having end extensions which include portions arranged in generally spaced parallel relation and other portions substantially parallel to and in slidable engagement with the tapered wedge surfaces of said handle, and means cooperative with such generally parallel spaced band portions for clamping said band tightly about the utensil and for forcing said other band portions over said wedge surfaces of said handle in a direction to bring the utensil and handle into tight engagement with one another.

4. In a utensil handle assembly, a handle of generally wedge shape in cross sectional configuration with its base adapted for abutment against the utensil and its tapered surfaces in vertical planes approximately 45° from the plane of such base and converging toward a point remote from the utensil, a band for encircling the utensil and part of such handle, said band having portions arranged parallel to and slidably engageable with the tapered surfaces of the handle, and means cooperative with said band portions for clamping the handle therebetween and for clamping the band about the utensil while cooperating with such band portions and tapered surfaces of the handle to effect a sliding movement therebetween in a direction to force the handle against the utensil.

5. A handle and band assembly such as defined by claim 4 wherein the wedge surfaces of the handle extend to a common crest.

6. A handle and band assembly such as defined by claim 4 wherein the clamping means is located intermediate the portions of the band that are slideably engageable with the handle and the utensil-encircling portion of the band.

(References on following page)

References Cited in the file of this patent

UNITED STATES PATENTS

| | | |
|---|---|---|
| 2,378,867 | Reichart | June 19, 1945 |
| 2,422,510 | Ward | June 17, 1947 |
| 2,441,892 | Mattoon | May 18, 1948 |
| 2,554,644 | Serio | May 29, 1951 |
| 2,605,010 | Sieling | July 29, 1952 |

FOREIGN PATENTS

| | | |
|---|---|---|
| 419,190 | France | Dec. 28, 1910 |